United States Patent
Kasemi et al.

(10) Patent No.: US 11,225,588 B2
(45) Date of Patent: Jan. 18, 2022

(54) METHOD FOR PRODUCING A CURING AGENT FOR LOW-EMISSION EPOXY RESIN COMPOSITIONS

(71) Applicant: SIKA TECHNOLOGY AG, Baar (CH)

(72) Inventors: Edis Kasemi, Zürich (CH); Andreas Kramer, Zürich (CH); Ursula Stadelmann, Zürich (CH); Urs Burckhardt, Zürich (CH)

(73) Assignee: SIKA TECHNOLOGY AG, Baar (CH)

( * ) Notice: Subject to any disclaimer, the term of this patent is extended or adjusted under 35 U.S.C. 154(b) by 158 days.

(21) Appl. No.: 16/487,954

(22) PCT Filed: Mar. 13, 2018

(86) PCT No.: PCT/EP2018/056132
§ 371 (c)(1),
(2) Date: Aug. 22, 2019

(87) PCT Pub. No.: WO2018/166996
PCT Pub. Date: Sep. 20, 2018

(65) Prior Publication Data
US 2020/0040215 A1    Feb. 6, 2020

(51) Int. Cl.
*C09D 163/00* (2006.01)
*C08G 59/18* (2006.01)
*C08G 59/24* (2006.01)
*C08G 59/50* (2006.01)

(52) U.S. Cl.
CPC ......... *C09D 163/00* (2013.01); *C08G 59/184* (2013.01); *C08G 59/245* (2013.01); *C08G 59/5033* (2013.01)

(58) Field of Classification Search
None
See application file for complete search history.

(56) References Cited

U.S. PATENT DOCUMENTS

2015/0337076 A1* 11/2015 Kasemi ............... C08G 59/184
528/103
2016/0177125 A1*  6/2016 Flosser ............... C09D 163/00
523/400

FOREIGN PATENT DOCUMENTS

| EP | 2 752 437 A1   | 7/2014 |
| WO | 2015/117846 A1 | 8/2015 |
| WO | 2016/023839 A1 | 2/2016 |
| WO | 2016/151006 A1 | 9/2016 |
| WO | 2017/037069 A1 | 3/2017 |

OTHER PUBLICATIONS

Apr. 26, 2018 International Search Report issued in International Patent Application No. PCT/EP2018/056132.

* cited by examiner

*Primary Examiner* — Ha S Nguyen
(74) *Attorney, Agent, or Firm* — Oliff PLC

(57) ABSTRACT

A process for preparing a curing agent for epoxy resins, in which an amine mixture including at least one parent amine of the formula (I) and at least one alkylated amine of the formula (II) is reacted or adducted with at least one glycidyl ether of the formula (III). The amine mixture is especially a reaction mixture from the partial alkylation of the amine of the formula (I). The process described enables, with low energy expenditure and high space-time yield, curing agents of low odor, low toxicity, low viscosity and high reactivity for epoxy resins and epoxy resin products that cure rapidly at ambient temperatures and especially also under cold conditions and at the same time enable high-quality coatings having an even, shiny surface.

14 Claims, No Drawings

METHOD FOR PRODUCING A CURING AGENT FOR LOW-EMISSION EPOXY RESIN COMPOSITIONS

TECHNICAL FIELD

The invention relates to the field of curing agents for epoxy resins and epoxy resin compositions, and to coatings, coverings and paints.

PRIOR ART

Epoxy resin products suitable for coating purposes should contain a minimum level of thinners and hence have low emissions, and at the same time nevertheless have a sufficiently low viscosity to have good processibility at ambient temperature. In addition, after application, they should cure very quickly and without defects, even under moist, cold conditions, and form an even, shiny and nontacky surface without haze, spots or craters. Finally, the coating obtained should have high hardness and strength. For visually demanding applications, for example top coverings of floors, it should additionally have a high level of gloss and low tendency to yellowing under the influence of light. Such properties can be achieved by means of specific amine curing agents.

WO 2015/117846 describes monoadducts of propane-1, 2-diamine and aromatic monoglycidyl ether, especially cresyl glycidyl ether, and use thereof as curing agent for epoxy resins. Such adduct amines enable low-emission epoxy resin products having good properties, especially when they are diluted with suitable low-viscosity amines.

WO 2016/023839 describes the use of optionally substituted benzylated propane-1,2-diamine as curing agent for epoxy resins. These alkylated amines are of very low viscosity and, as such and especially together with adduct amines, enable low-emission epoxy resin products having good properties. A curing agent comprising a combination of adduct amines and alkylated amines, especially a combination of the amines known from WO 2015/117846 and WO 2016/023839, enables epoxy resin products having properties of particular interest. But the known process for preparing such a curing agent is relatively complex since the amines are each prepared individually and the parent amine propane-1,2-diamine which is used in excess in both preparations has to be removed individually in each case in order to obtain low-emission products.

SUMMARY OF THE INVENTION

It is therefore an object of the invention to provide a simplified process for preparing a curing agent of low odor and low toxicity, low viscosity and high reactivity, comprising a combination of adduct amines and alkylated amines, like the amines known from WO 2015/117846 and WO 2016/023839, for epoxy resins that enables low-emission epoxy resin products which cure rapidly at ambient temperatures and especially also under cold conditions and at the same time enable high-quality coatings having an even, shiny surface. This object is achieved by the process as described in claim 1. This involves reacting an amine mixture comprising at least one parent amine of the formula (I) and at least one alkylated amine of the formula (II) with a glycidyl ether of the formula (III). This gives rise to a curing agent for epoxy resins that comprises at least one adduct amine of the formula (IV) and typically at least one alkylated amine of the formula (II).

The process according to the invention is a significant simplification of the known preparation process in which the amines of the formula (II) and (IV) that have been separately prepared and purified beforehand are blended with one another. It is a direct preparation of the curing agent in that the parent amine of the formula (I) is alkylated in a first stage and the reaction mixture obtained is adducted in a second stage without purifying the reaction mixture from the alkylation by distillation. Given suitable stoichiometry, the curing agent formed comprises, as main components, alkylated amines of the formula (II) and adduct amines of the formula (IV).

The process of the invention is performable much more quickly and economically than the process known from the prior art, since the reaction can be run as a one-pot reaction and the complex purification of the separately prepared amines, especially the double removal of the excess parent amine of the formula (I), is dispensed with. This increases the product yield and the space-time yield, and lowers the energy expenditure for the preparation.

The curing agent obtained from the process of the invention enables epoxy resin products of low odor and emissions and good processibility with rapid curing, high hardness with a nice surface, and a relatively low tendency to yellowing. Surprisingly, it differs only slightly in its properties from a curing agent obtained conventionally from the separately prepared and purified amines, especially also in the particularly critical aspects of viscosity, reactivity or curing rate, and tendency to yellowing.

Further aspects of the invention are the subject of further independent claims. Particularly preferred embodiments of the invention are the subject of the dependent claims.

WAYS OF EXECUTING THE INVENTION

The invention provides a process for preparing a curing agent for epoxy resins, characterized in that an amine mixture comprising at least one parent amine of the formula (I) and at least one alkylated amine of the formula (II)

where
A in both formulae is the same alkylene radical which has 2 to 15 carbon atoms and optionally has cyclic components and optionally secondary or tertiary amino groups,
X is a hydrogen radical or is Y,
Y is an alkyl or cycloalkyl or aralkyl radical having 1 to 20 carbon atoms,
is reacted with at least one glycidyl ether of the formula (III)

where
m is 1 or 2 or 3, and
Z is an m-valent hydrocarbyl radical optionally containing ether oxygen and having a molecular weight in the range from 56 to 1'500 g/mol.

A "primary amino group" refers to an amino group which is bonded to a single organic radical and bears two hydrogen atoms; a "secondary amino group" refers to an amino group which is bonded to two organic radicals which may also together be part of a ring and bears one hydrogen atom; and a "tertiary amino group" refers to an amino group which is bonded to three organic radicals, two or three of which may also be part of one or more rings, and does not bear any hydrogen atom.

"Amine hydrogen" refers to the hydrogen atoms of primary and secondary amino groups.

"Amine hydrogen equivalent weight" refers to the mass of an amine or an amine-containing composition that contains one molar equivalent of amine hydrogen.

A "thinner" refers to a substance which is soluble in an epoxy resin and lowers its viscosity, and which is not chemically incorporated into the epoxy polymer in the curing process.

"Viscosity" refers to the dynamic viscosity or shear viscosity which is defined by the ratio between the shear stress and the shear rate (speed gradient) and is determined as described in the description or the working examples.

"Molecular weight" refers to the molar mass (in g/mol) of a molecule. "Average molecular weight" refers to the number average $M_n$ of a polydisperse mixture of oligomeric or polymeric molecules, which is typically determined by means of gel permeation chromatography (GPC) against polystyrene as standard.

"Room temperature" refers to a temperature of 23° C.

A dotted line in the formulae in each case represents the bond between a substituent and the corresponding molecular radical.

Preferably, A is an alkylene radical which has 2 to 10 carbon atoms and optionally has cyclic components and optionally secondary or tertiary amino groups.

Preferably, A is free of secondary and tertiary amino groups. Such an amine mixture enables curing agents that enable epoxy resin products having particularly nice surfaces.

More preferably, A is an alkylene radical having 2 to 6, especially 2 or 3, carbon atoms. Such a curing agent enables epoxy resin products having particularly nice surfaces and a particularly low tendency to yellowing.

Preferably, A is selected from the group consisting of 1,2-ethylene, 1,2-propylene, 1,3-propylene, 1,3-pentylene, 2-methyl-1,5-pentylene, 1,6-hexylene, 2,2(4),4-trimethyl-1,6-hexamethylene, 1,3-cyclohexylenebis(methylene), 1,4-cyclohexylenebis(methylene), 1,3-phenylenebis(methylene), 1,4-phenylenebis(methylene), 1,2-cyclohexylene, 1,3-cyclohexylene, 1,4-cyclohexylene, (1,5,5-trimethylcyclohexan-1-yl)methane-1,3, 4(2)-methyl-1,3-cyclohexylene, methylenedicyclohexan-4-yl, methylenebis(2-methylcyclohexan-4-yl), (bicyclo[2.2.1]heptan-2,5(2,6)-diyl)dimethylene, (tricyclo[5.2.1.0$^{2,6}$]decan-3(4),8(9)-diyl)dimethylene, 3-aza-1,5-pentylene, 3,6-diaza-1,8-octylene, 3,6,9-triaza-1,11-undecylene, 3,6,9,12-tetraaza-1,14-tetradecylene, 3,6,9,12,15-pentaaza-1,17-heptadecylene, 4-aza-2,6-heptylene, 4-aza-1,7-heptylene, 4,7-diaza-1,10-decylene and 7-aza-1,13-tridecylene. Among these, preference is given to 1,2-ethylene, 1,2-propylene or 2-methyl-1,5-pentylene, especially 1,2-ethylene or 1,2-propylene.

Most preferably, A is 1,2-propylene. Such a curing agent enables epoxy resin products having particularly low viscosity, particularly nice surfaces, particularly rapid curing and a particularly low tendency to yellowing.

Preferably, X is a hydrogen radical.

More preferably, the amine mixture, as well as at least one monoalkylated amine of the formula (II) in which X is a hydrogen radical, additionally contains at least one dialkylated amine of the formula (II) in which X is Y.

The weight ratio here between the monoalkylated amine and the dialkylated amine of the formula (II) is preferably in the range from 40/60 to 99/1, especially 51/49 to 90/10.

Such an amine mixture is obtainable in a particularly simple manner by a partial alkylation of the parent amine of the formula (I).

Preferably, Y is an alkyl or cycloalkyl or aralkyl radical having 3 to 10 carbon atoms.

More preferably, Y is a radical of the formula

where
$R^1$ is a hydrogen radical or is methyl or phenyl, and
$R^2$ is a five- or six- or seven-membered cycloalkyl or aryl radical which has 4 to 7 carbon atoms and is optionally alkyl-substituted.

Preferably, $R^1$ is a hydrogen radical or is methyl, especially a hydrogen radical.

Preferably, $R^2$ is cyclohexyl, phenyl or 1-naphthyl.

More preferably, Y is selected from the group consisting of cyclohexylmethyl, benzyl, 1-phenylethyl and 1-naphthylmethyl.

Even more preferably, Y is benzyl, 1-phenylethyl or 1-naphthylmethyl, most preferably benzyl. Such a curing agent is of particularly low viscosity and enables epoxy resin products with speedy curing and particularly nice surfaces.

Preferably, m is 1 or 2.

Preferably, Z is the residue of a mono- or divalent aryl glycidyl ether after removal of the glycidoxy groups.

More preferably, Z is the residue of o-, m- or p-cresyl glycidyl ether, bisphenol A diglycidyl ether, bisphenol F diglycidyl ether or bisphenol A/F diglycidyl ether after removal of the glycidoxy groups.

Most preferably, Z is the residue of o-cresyl glycidyl ether or bisphenol A diglycidyl ether after removal of the glycidoxy groups.

The parent amine of the formula (I) is preferably ethane-1,2-diamine, propane-1,2-diamine, propane-1,3-diamine, pentane-1,3-diamine (DAMP), 1,5-diamino-2-methylpentane (MPMD), hexane-1,6-diamine, 2,2(4),4-trimethylhexamethylenediamine (TMD), 1,3-bis(aminomethyl)cyclohexane, 1,4-bis(aminomethyl)cyclohexane, 1,3-bis(aminomethyl)benzene, 1,4-bis(aminomethyl)benzene, 1,2-diaminocyclohexane, 1,3-diaminocyclohexane, 1,4-diaminocyclohexane, 1-amino-3-aminomethyl-3,5,5-trimethylcyclohexane (isophoronediamine or IPDA), 2- and 4-methyl-1,3-diaminocyclohexane and mixtures thereof, bis(4-aminocyclohexyl)methane, bis(4-amino-3-methylcyclohexyl)methane, 2,5(2,6)-bis(aminomethyl)bicyclo[2.2.1]heptane (NBDA), 3(4), 8(9)-bis(aminomethyl)tricyclo[5.2.1.0$^{2,6}$]decane, diethylenetriamine (DETA), triethylenetetramine (TETA), tetraethylenepentamine (TEPA), pentaethylenehexamine (PEHA), polyethylenepolyamine having 5 to 7 ethyleneamine units (called "higher ethylenepolyamine", HEPA), dipropylenetriamine (DPTA), N-(2-aminoethyl)propane-1,3-diamine (N3 amine), N,N'-bis(3-aminopropyl)ethylenediamine (N4 amine) or bis(hexamethylene)triamine (BHMT).

More preferably, the parent amine of the formula (I) is ethane-1,2-diamine, propane-1,2-diamine or MPMD, especially ethane-1,2-diamine or propane-1,2-diamine, most preferably propane-1,2-diamine.

More preferably, the alkylated amine of the formula (II) is N-benzylethane-1,2-diamine or a mixture of N-benzylethane-1,2-diamine and N,N'-dibenzylethane-1,2-diamine; N-(1-phenylethyl)ethane-1,2-diamine or a mixture of N-(1-phenylethyl)ethane-1,2-diamine and N,N'-bis(1-phenylethyl)ethane-1,2-diamine; N-(1-naphthylmethyl)ethane-1,2-diamine or a mixture of N-(1-naphthylmethyl)ethane-1,2-diamine and N,N'-bis(1-naphthylmethyl)ethane-1,2-diamine; $N^1$-benzylpropane-1,2-diamine or $N^2$-benzylpropane-1,2-diamine or a mixture thereof, optionally in a mixture with N,N'-dibenzylpropane-1,2-diamine; $N^1$-(1-phenylethyl)propane-1,2-diamine or $N^2$-(1-phenylethyl)propane-1,2-diamine or a mixture thereof, optionally in a mixture with N,N'-bis(1-phenylethyl)propane-1,2-diamine; $N^1$-(1-naphthylmethyl)propane-1,2-diamine or $N^2$-(1-naphthylmethyl)propane-1,2-diamine or a mixture thereof, optionally in a mixture with N,N'-bis(1-naphthylmethyl)propane-1,2-diamine; or is $N^1$-benzyl-2-methylpentane-1,5-diamine or $N^5$-benzyl-2-methylpentane-1,5-diamine or a mixture thereof, optionally in a mixture with N,N'-dibenzyl-2-methylpentane-1,5-diamine.

A preferred amine mixture comprises as parent amine of the formula (I) an amine selected from the group consisting of ethane-1,2-diamine, propane-1,2-diamine, propane-1,3-diamine, pentane-1,3-diamine (DAMP), 1,5-diamino-2-methylpentane (MPMD), hexane-1,6-diamine, 2,2(4),4-trimethylhexamethylenediamine (TMD), 1,3-bis(aminomethyl)cyclohexane, 1,4-bis(aminomethyl)cyclohexane, 1,3-bis(aminomethyl)benzene, 1,4-bis(aminomethyl)benzene, 1,2-diaminocyclohexane, 1,3-diaminocyclohexane, 1,4-diaminocyclohexane, 1-amino-3-aminomethyl-3,5,5-trimethylcyclohexane (isophoronediamine or IPDA), 2- and 4-methyl-1,3-diaminocyclohexane and mixtures thereof, bis(4-aminocyclohexyl)methane, bis(4-amino-3-methylcyclohexyl)methane, 2,5(2,6)-bis(aminomethyl)bicyclo[2.2.1]heptane (NBDA), 3(4), 8(9)-bis(aminomethyl)tricyclo[5.2.1.0$^{2,6}$]decane, diethylenetriamine (DETA), triethylenetetramine (TETA), tetraethylenepentamine (TEPA), pentaethylenehexamine (PEHA), polyethylenepolyamine having 5 to 7 ethyleneamine units (called "higher ethylenepolyamine", HEPA), dipropylenetriamine (DPTA), N-(2-aminoethyl)propane-1,3-diamine (N3 amine), N,N'-bis(3-aminopropyl)ethylenediamine (N4 amine) and bis(hexamethylene)triamine (BHMT); and as alkylated amine of the formula (II) the corresponding N-monobenzylated and/or N,N'-dibenzylated amine.

A further preferred amine mixture comprises as parent amine of the formula (I) ethane-1,2-diamine; and as alkylated amine of the formula (II) at least one amine selected from the group consisting of N-benzylethane-1,2-diamine, N,N'-dibenzylethane-1,2-diamine, N-(4-methoxybenzyl)ethane-1,2-diamine, N,N'-bis(4-methoxybenzyl)ethane-1,2-diamine, N-(4-dimethylaminobenzyl)ethane-1,2-diamine, N,N'-bis(4-dimethylaminobenzyl)ethane-1,2-diamine, N-(1-phenylethyl)ethane-1,2-diamine, N,N'-bis(1-phenylethyl)ethane-1,2-diamine, N-(1-naphthylmethyl)ethane-1,2-diamine and N,N'-bis(1-naphthylmethyl)ethanediamine.

A further preferred amine mixture comprises as parent amine of the formula (I) propane-1,2-diamine; and as alkylated amine of the formula (II) at least one amine selected from the group consisting of $N^1$-cyclohexylmethylpropane-1,2-diamine, $N^2$-cyclohexylmethylpropane-1,2-diamine, N,N'-bis(cyclohexylmethyl)propane-1,2-diamine, $N^1$-benzylpropane-1,2-diamine, $N^2$-benzylpropane-1,2-diamine, N,N'-dibenzylpropane-1,2-diamine, $N^1$-(4-methoxybenzyl)propane-1,2-diamine, $N^2$-(4-methoxybenzyl)propane-1,2-diamine, N,N'-bis(4-methoxybenzyl)propane-1,2-diamine, $N^1$-(4-dimethylaminobenzyl)propane-1,2-diamine, $N^2$-(4-dimethylaminobenzyl)propane-1,2-diamine, N,N'-bis(4-dimethylaminobenzyl)propane-1,2-diamine, $N^1$-(1-phenylethyl)propane-1,2-diamine, $N^2$-(1-phenylethyl)propane-1,2-diamine, N,N'-bis(1-phenylethyl)propane-1,2-diamine, $N^1$-(1-naphthylmethyl)propane-1,2-diamine, $N^2$-(1-naphthylmethyl)propane-1,2-diamine and N,N'-bis(1-naphthylmethyl)propane-1,2-diamine.

A further preferred amine mixture comprises as parent amine of the formula (I) 1,5-diamino-2-methylpentane; and as alkylated amine of the formula (II) at least one amine selected from the group consisting of $N^1$-benzyl-1,5-diamino-2-methylpentane, $N^2$-benzyl-1,5-diamino-2-methylpentane, N,N'-dibenzyl-1,5-diamino-2-methylpentane, $N^1$-(1-phenylethyl)-1,5-diamino-2-methylpentane, N2-(1-phenylethyl)-1,5-diamino-2-methylpentane and N,N'-bis(1-phenylethyl)-1,5-diamino-2-methylpentane.

Most preferred is an amine mixture comprising propane-1,2-diamine, $N^1$-benzylpropane-1,2-diamine, $N^2$-benzylpropane-1,2-diamine and N,N'-dibenzylpropane-1,2-diamine. Such a curing agent is of very particularly low viscosity and enables epoxy resin products having particularly rapid curing, particularly nice surfaces and a particularly low tendency to yellowing.

The glycidyl ether of the formula (III) is preferably o-, m- or p-cresyl glycidyl ether, bisphenol A diglycidyl ether, bisphenol F diglycidyl ether or bisphenol A/F diglycidyl ether, especially o-cresyl glycidyl ether or bisphenol A diglycidyl ether.

Preferably, the parent amine of the formula (I) and alkylated amines of the formula (II) are present in the amine mixture in such an amount that the weight ratio between the amine of the formula (I) and amines of the formula (II) is in the range from 80/20 to 10/90, preferably 60/40 to 20/80.

In the process of the invention, the reaction between the amine mixture and the glycidyl ether of the formula (III) is preferably conducted in such a way that the primary amino groups are in a stoichiometric excess over the epoxy groups. Preferably, the molar ratio between the primary amino groups in the amine mixture and the epoxy groups is in the range from 3/1 to 30/1, more preferably 5/1 to 20/1.

Such a reaction is also referred to hereinafter as adduct formation.

Preferably, the molar ratio between the parent amine of the formula (I) and the epoxy groups is in the range from 1/1 to 15/1, more preferably 2/1 to 10/1.

If the glycidyl ether of the formula (III) is a monoglycidyl ether, i.e. m is 1, the molar ratio between the parent amine of the formula (I) and the epoxy groups is preferably in the range from 1.5/1 to 10/1, especially 2/1 to 7/1.

If the glycidyl ether of the formula (III) is a di- or triglycidyl ether, i.e. m is 2 or 3, the molar ratio between the parent amine of the formula (I) and the epoxy groups is preferably in the range from 2/1 to 15/1, especially 2.5/1 to 10/1.

Preferably, the temperature in the adduct formation is in the range from 40 to 120° C., especially 60 to 100° C.

Preferably, the amine mixture is initially charged and warmed up, and then the glycidyl ether of the formula (III) is metered in, ensuring that the temperature of the reaction mixture remains within the temperature range specified.

After the adduct has been formed, the reaction mixture obtained is preferably freed of volatile constituents by a suitable method, preferably by means of distillation, especially by means of thin-film and/or thin-layer and/or short-path distillation, which is also referred to as stripping.

Preferably, parent amine of the formula (I) that remains after the adduct has been formed is at least partly removed from the curing agent, especially by means of stripping.

Especially if the parent amine of the formula (I) has an alkylene radical having 2 to 6, especially 2 or 3, carbon atoms as A, preference is given to the removal of remaining amine of the formula (I). In this way, a curing agent largely free of volatile amines is obtained, which is advantageous in relation to odor, toxicity and surface quality of the epoxy resin products obtained thereby.

The amine mixture used for the adduct formation, comprising at least one parent amine of the formula (I) and at least one alkylated amine of the formula (III), is preferably a reaction mixture from the alkylation of a superstoichiometric amount of at least one amine of the formula (I) with at least one alkylating agent. Such a reaction mixture contains, as well as alkylated amines of the formula (II), unconverted parent amine of the formula (I) which is left in the reaction mixture.

Preferably, the alkylation is a reductive alkylation, where the alkylating agent used is an aldehyde or ketone and hydrogen. Preference is given here to working with a molar ratio between the amine of the formula (I) and the aldehyde or ketone in the range from 1.5/1 to 10/1, preferably 1.7/1 to 5/1. Preference is thus given to the formation of monoalkylated amines of the formula (II) in which X is a hydrogen radical, and a suitable amount of unconverted amine of the formula (I) is ultimately available for the adduct formation.

For the reductive alkylation, preference is given to using an aldehyde or ketone selected from the group consisting of cyclohexylcarbaldehyde, benzaldehyde, 4-methoxybenzaldehyde, 4-(dimethylamino)benzaldehyde, acetophenone and 1-naphthaldehyde, more preferably benzaldehyde, acetophenone or 1-naphthaldehyde, especially benzaldehyde.

Preference is given to conducting the reductive alkylation in the presence of a suitable catalyst. Preferred catalysts are palladium on charcoal (Pd/C), platinum on charcoal (Pt/C), Adams' catalyst or Raney nickel, especially palladium on charcoal or Raney nickel.

When molecular hydrogen is used, the reductive alkylation is preferably worked in a pressure apparatus at a hydrogen pressure of 5 to 150 bar, especially 10 to 100 bar. This can be effected in a batchwise process or preferably in a continuous process.

The reductive alkylation is preferably conducted at a temperature in the range from 40 to 120° C., especially 60 to 100° C.

The invention further provides the reaction mixture obtained from the process described.

The reaction mixture contains at least one adduct amine of the formula (IV) and at least one adduct amine of the formula (V).

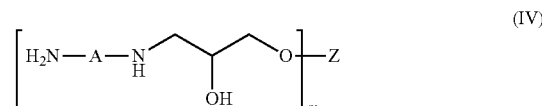

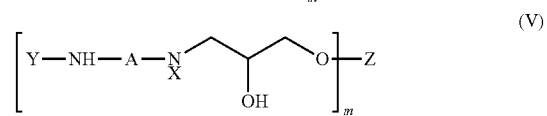

In the formulae (IV) and (V), A, X, Y, m and Z have the definitions already given.

If m is 2 or 3, the reaction mixture typically additionally comprises mixed adduct amines as shown in the following formulae:

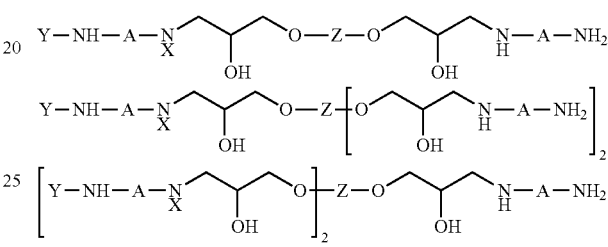

In addition, the reaction mixture typically comprises proportions of higher adduct amines as formed by reaction of an amine of the formula (I) or (II) with more than one glycidyl ether of the formula (III).

In addition, the reaction mixture typically comprises unconverted alkylated amines of the formula (II) and possibly unconverted parent amine of the formula (I).

The reaction mixture is particularly suitable as curing agent for epoxy resins. Such a curing agent preferably comprises, as its main constituent, alkylated amines of the formula (II) and adduct amines of the formula (IV). Such a curing agent is especially obtained by the described preferred embodiments of the process.

Unconverted parent amine of the formula (I) can be removed from the reaction mixture after the adduct formation, especially by means of distillation. Especially in the case of a relatively volatile parent amine of the formula (I) in which A is an alkylene radical having 2 to 6, especially 2 or 3, carbon atoms, as in the case of propane-1,2-diamine in particular, unconverted parent amine of the formula (I) is removed from the reaction mixture by distillation after the adduct formation.

Preferably, the reaction mixture, when used as curing agent for epoxy resins, has a content of parent amine of the formula (I) of less than 5% by weight, especially less than 2.5% by weight, most preferably less than 1% by weight. Particularly if A is an alkylene radical having 2 to 6, especially 2 or 3, carbon atoms, the curing agent preferably contains a small content of parent amine of the formula (I).

The curing agent for epoxy resins optionally contains further amines that do not conform to the formula (I) or (II) or adduct amines derived therewith from the reaction with the glycidyl ether of the formula (III).

The curing agent described optionally comprises at least one accelerator. Preferred accelerators are acids or compounds hydrolyzable to acids, tertiary amines, salts of tertiary amines, quaternary ammonium salts, amidines, guanidines, phenols, Mannich bases, phosphites or compounds having mercapto groups, especially acids, tertiary amines or Mannich bases. Particular preference is given to salicylic acid or 2,4,6-tris(dimethylaminomethyl)phenol or a combination thereof.

The curing agent described optionally comprises at least one thinner, especially benzyl alcohol, 2-phenoxyethanol, cardanol (from cashewnutshell oil, comprising 3-(8,11,14-pentadecatrienyl)phenol as its main constituent), styrenized phenol or aromatic hydrocarbon resins containing phenol groups. A particularly preferred thinner is cardanol which is obtained from renewable raw materials.

The invention further provides an epoxy resin composition comprising
a resin component comprising at least one epoxy resin and
a curing agent component comprising the reaction mixture from the process described.

Suitable epoxy resins are standard industrial epoxy resins. These are obtained in a known manner, for example from the oxidation of the corresponding olefins or from the reaction of epichlorohydrin with the corresponding polyols, polyphenols or amines.

Particularly suitable epoxy resins are what are called liquid polyepoxide resins, referred to as "liquid resin" hereinafter. These have a glass transition temperature below 25° C.

Likewise possible as epoxy resin are what are called solid resins which have a glass transition temperature above 25° C. and can be comminuted to powders that are pourable at 25° C.

A preferred epoxy resin in the resin component is a liquid resin based on a bisphenol, especially a diglycidyl ether of bisphenol A, bisphenol F or bisphenol A/F, as commercially available, for example, from Dow, Huntsman or Momentive. These liquid resins have a low viscosity for epoxy resins and good properties in the cured state as a coating. They may contain proportions of solid bisphenol A resin or novolak glycidyl ethers.

The resin component may additionally comprise a reactive diluent, especially a reactive diluent having at least one epoxy group, especially a glycidyl ether of mono- or polyhydric phenols or aliphatic or cycloaliphatic alcohols, especially butanediol diglycidyl ether, hexanediol diglycidyl ether, polyoxypropylene glycol diglycidyl ether, cardanol glycidyl ether or glycidyl ethers of natural alcohols such as $C_8$- to $C_{10}$-, $C_{12}$- to $C_{14}$- or $C_{13}$- to $C_{15}$-alkyl glycidyl ethers.

The epoxy resin composition optionally comprises further constituents, especially auxiliaries and additives typically used in epoxy resin compositions, especially solvents, thinners, film-forming auxiliaries, extenders, polymers, inorganic and/or organic fillers, fibers, pigments, rheology modifiers, adhesion improvers, stabilizers against oxidation, heat, light or UV radiation, flame-retardant substances, surface-active substances or biocides.

In the epoxy resin composition, the ratio of the number of groups reactive toward epoxy groups relative to the number of epoxy groups is preferably in the range from 0.5 to 1.5, especially 0.7 to 1.2.

The resin component and the curing agent component of the epoxy resin composition are each stored in a separate container. Further constituents of the epoxy resin composition may be present as a constituent of the resin component or of the curing agent component; further constituents reactive toward epoxy groups are preferably a constituent of the curing agent component. It is likewise possible that further constituents are present as a dedicated, separate component.

The components are storable, meaning that they can be stored prior to use for several months up to one year or longer, without any change in their respective properties to a degree of relevance to their use.

For the use of the epoxy resin composition, the components are mixed with one another shortly before or during the application.

The mixing of the components is effected by means of a suitable method; it can be effected continuously or batchwise. The mixing is especially effected at ambient temperature, which is typically within the range from about 5 to 50° C., preferably about 10 to 30° C.

The mixing of the two components commences the curing by chemical reaction. This involves reaction of the amine hydrogens present in the epoxy resin composition and of any further groups present that are reactive toward epoxy groups with the epoxy groups, with ring opening (addition reaction) thereof. As a result mainly of this reaction, the composition polymerizes and ultimately cures.

The curing typically proceeds at a temperature in the range from 0 to 150° C. It preferably proceeds at ambient temperature and typically extends over a few days to weeks. The duration depends upon factors including the temperature, the reactivity of the constituents and the stoichiometry thereof, and on the presence of accelerators.

The invention thus further provides a cured composition obtained from the curing of an epoxy resin composition as described in the present document.

The epoxy resin composition is applied to at least one substrate, the following substrates being particularly suitable:
  glass, glass ceramic, concrete, mortar, brick, tile, gypsum and natural rocks such as granite or marble;
  metals or alloys such as aluminum, iron, steel or nonferrous metals, or surface-finished metals or alloys such as galvanized or chromed metals;
  leather, textiles, paper, wood, woodbase materials bonded with resins, e.g. phenolic, melamine or epoxy resins, resin-textile composites or further polymer composites;
  plastics, especially rigid or flexible PVC, ABS, polycarbonate (PC), polyamide (PA), polyesters, PMMA, epoxy resins, PUR, POM, PO, PE, PP, EPM or EPDM, where the plastics have optionally been surface-treated by means of plasma, corona or flames;
  fiber-reinforced plastics, such as carbon fiber-reinforced plastics (CRP), glass fiber-reinforced plastics (GRP) or sheet molding compounds (SMC);
  coated substrates such as powder-coated metals or alloys;
  paints or varnishes.

The substrates can be pretreated if required prior to the application of the epoxy resin composition.

The epoxy resin composition described is advantageously usable as fiber composite matrix for fiber composite materials (composites) such as, in particular, CRP or GRP, or as a potting compound or casting resin, sealant, adhesive, covering, coating, paint, varnish, seal, basecoat or primer.

It is especially usable as a covering, coating, paint, varnish, seal, basecoat or primer for construction and industrial applications, especially as a floor covering or floor coating for interiors such as offices, industrial halls, gym halls or cooling spaces, or outdoors for balconies, terraces, parking decks, bridges or roofs, as a protective coating for concrete, cement, metals, plastics or wood, for example for surface sealing of wood constructions, vehicles, loading areas, tanks, silos, shafts, pipelines, machines or steel constructions, for example of ships, piers, offshore platforms, lock gates, hydroelectric power plants, river constructions, swimming pools, wind turbines, bridges, chimneys, cranes or sheet-pile walls, or as an undercoat, tiecoat or anticorrosion primer or for hydrophobization of surfaces.

It is especially usable additionally as an adhesive, especially as a bodywork adhesive, sandwich element adhesive, half-shell adhesive for rotor blades of wind turbines, bridge element adhesive or anchoring adhesive.

Especially when it is used as a coating, covering or paint, it is possible to apply a further coating, further covering or further paint to the fully or partly cured epoxy resin composition, in which case said further layer may likewise be an epoxy resin composition, or else another material, especially a polyurethane or polyurea coating.

Particularly advantageously, the epoxy resin composition described is used as a coating.

As a coating, the epoxy resin composition is advantageously used in a method of coating, wherein it has a fluid consistency with low viscosity and good leveling properties, and is especially applied as a self-leveling or thixotropic coating to predominantly even areas or as a paint. Preferably, the epoxy resin composition in this application, immediately after the resin component and the curing agent component have been mixed, has a viscosity, measured at 20° C., in the range from 0.3 to 4 Pa·s, more preferably 0.3 to 2 Pa·s, especially 0.3 to 1.5 Pas. The mixed composition is applied to a substrate within the processing time over an area as a thin film having a layer thickness of typically about 50 μm to about 5 mm, typically at ambient temperature. Application is effected especially by pouring onto the substrate to be coated and subsequent homogeneous distribution with the aid, for example, of a coating bar or a notched trowel. Application can also be effected with a brush or roller or in the form of a spray application, for example as an anticorrosion coating on steel.

The application of the epoxy resin composition gives rise to an article comprising the cured composition from the curing of the epoxy resin composition described. The cured composition is especially in the form of a coating.

The epoxy resin composition described features advantageous properties. It has low odor and low emissions and good processibility, gives good wetting of the substrates and cures speedily and without defects, even at cool ambient temperatures. The curing gives rise to high-quality epoxy resin products having high hardness and an even, nontacky and smooth surface which, according to the amines used in the preparation process for the curing agent described, show barely any or virtually no yellowing at all.

EXAMPLES

Working examples are adduced hereinafter, which are intended to give detailed elucidation of the invention described. It will be appreciated that the invention is not restricted to these described working examples.

"ANEW" stands for amine hydrogen equivalent weight.
"EEW" stands for epoxy equivalent weight.
"Standard climatic conditions" refer to a temperature of 23±1° C. and a relative air humidity of 50±5%. "SCC" stands for "standard climatic conditions".

Description of Measuring Methods:
Viscosity was measured on a thermostated Rheotec RC30 cone-plate viscometer (cone diameter 50 mm, cone angle 1°, cone tip-plate distance 0.05 mm, shear rate 10 s$^{-1}$).

Amine value was determined by means of titration (with 0.1N HClO$_4$ in acetic acid versus crystal violet).

Substances Used:
Araldite® DY-K: cresyl glycidyl ether, EEW about 182 g/eq (from Huntsman)
Araldite® GY 250: bisphenol A diglycidyl ether, EEW about 187.5 g/eq (from Huntsman)
Araldite® DY-E: monoglycidyl ether of $C_{12}$ to $C_{14}$ alcohols, EEW around 290 g/eq (from Huntsman)
Cardanol: from cashewnutshell oil, comprising 3-(8,11,14-pentadecatrienyl)phenol as its main constituent, Cardolite® NX-2026 (from Cardolite Corp.)

Preparation of Amine Mixtures Comprising Parent Amine of the Formula (I) and Alkylated Amines of the Formula (II)

Amine Mixture M1:
A round-bottom flask was initially charged with 274.3 g (3.7 mol) of propane-1,2-diamine under a nitrogen atmosphere at room temperature. With good stirring, a solution of 106.1 g (1 mol) of benzaldehyde in 750 mL of isopropanol was slowly added dropwise, and the mixture was stirred for 2 hours. The reaction mixture was then hydrogenated in a continuous hydrogenation apparatus with a Pd/C fixed bed catalyst at a hydrogen pressure of 90 bar, a temperature of 85° C. and a flow rate of 5 mL/min. To monitor the reaction, IR spectroscopy was used to check whether the imine band at about 1665 cm$^{-1}$ had disappeared. Then the isopropanol was distilled out of the hydrogenated solution by distillation. What was obtained was a clear, pale yellowish liquid which, by GC analysis, contained a content of 56.0% by weight of propane-1,2-diamine, 40.1% by weight of a mixture of $N^1$-benzylpropane-1,2-diamine and $N^2$-benzylpropane-1,2-diamine and 3.9% by weight of N,N'-dibenzylpropane-1,2-diamine.

Amine Mixture M2:
To 45.0 g of the amine mixture M1 were added 24.7 g of propane-1,2-diamine. What was obtained was a clear, pale yellowish liquid which, by GC analysis, contained a content of 71.6% by weight of propane-1,2-diamine, 25.9% by weight of a mixture of $N^1$-benzylpropane-1,2-diamine and $N^2$-benzylpropane-1,2-diamine and 2.5% by weight of N,N'-dibenzylpropane-1,2-diamine.

Preparation of Curing Agents by the Process of the Invention

Curing Agent H1:
An initial charge of 45.0 g of the amine mixture M1 under a nitrogen atmosphere was heated to 70° C. and then, with good stirring, 15.6 g of cresyl glycidyl ether (Araldite® DY-K) was added gradually, with the temperature of the reaction mixture from 70 to 80° C. After 1 hour at 80° C., the reaction mixture was cooled down and propane-1,2-diamine and further volatile constituents were removed on a rotary evaporator at 65° C. What was obtained was a clear, pale yellowish liquid having an amine value of 501 mg KOH/g, a viscosity of 0.29 Pas at 20° C. and an AHEW of about 79.1 g/eq.

Curing Agent H2:
An initial charge of 69.7 g of the amine mixture M2 under a nitrogen atmosphere was heated to 70° C. and then, with good stirring, 31.0 g of cresyl glycidyl ether (Araldite® DY-K) was added gradually, with the temperature of the reaction mixture from 70 to 80° C. After 1 hour at 80° C., the reaction mixture was cooled down and propane-1,2-diamine and further volatile constituents were removed on a rotary evaporator at 65° C. What was obtained was a clear, pale yellowish liquid having an amine value of 462 mg KOH/g, a viscosity of 1.12 Pas at 20° C. and an AHEW of about 82.7 g/eq.

Curing Agent H3:

An initial charge of 45.0 g of the amine mixture M1 under a nitrogen atmosphere was heated to 70° C. and then, with good stirring, 8.5 g of Araldite® GY 250 was added gradually, with the temperature of the reaction mixture from 70 to 80° C. After 1 hour at 80° C., the reaction mixture was cooled down and propane-1,2-diamine and further volatile constituents were removed on a rotary evaporator at 65° C. What was obtained was a clear, pale yellowish liquid having an amine value of 551 mg KOH/g, a viscosity of 0.71 Pas at 20° C. and an AHEW of about 75.5 g/eq.

Preparation of Alkylated Amines and Adduct Amines as Comparison: Benzylated PDA 45.0 g of the amine mixture M1 were initially charged in a round-bottom flask, and the volatile constituents, especially propane-1,2-diamine, were removed on a rotary evaporator at 65° C. What was obtained was a clear, pale yellowish liquid having an AHEW of about 70.0 g/eq, which, by GC analysis, contained a content of 85.5% by weight of a mixture of $N^1$-benzylpropane-1,2-diamine and $N^2$-benzylpropane-1,2-diamine and 13.5% by weight of N,N'-dibenzylpropane-1,2-diamine.

Adduct V1:

An initial charge of 4.74 kg of propane-1,2-diamine under a nitrogen atmosphere was heated to 70° C. and then, with good stirring, 2.93 kg of cresyl glycidyl ether (Araldite® DY-K) was added gradually, with the temperature of the reaction mixture from 70 to 80° C. After 1 hour at 80° C., the reaction mixture was cooled down and the volatile constituents, especially propane-1,2-diamine, were removed by distillation by means of a thin-film evaporator (0.5-1 mbar, jacket temperature 115° C.). What was obtained was a clear, pale yellowish liquid having an amine value of 478.7 mg KOH/g, a viscosity of 3.3 Pa·s at 20° C. and an AHEW of about 90.0 g/eq.

Adduct V2:

An initial charge of 25.2 g of propane-1,2-diamine under a nitrogen atmosphere was heated to 70° C. and then, with good stirring, 8.5 g of Araldite® GY 250 was added gradually, with the temperature of the reaction mixture from 70 to 80° C. After 1 hour at 80° C., the reaction mixture was cooled down and the volatile constituents, especially propane-1,2-diamine, were removed on a rotary evaporator at 65° C. Subsequently, the reaction mixture was admixed with 20.0 g of benzylated PDA, prepared as defined above, and cooled down to room temperature. What was obtained was a clear, pale yellowish liquid having an amine value of 568 mg KOH/g, a viscosity of 0.46 Pa·s at 20° C. and an AHEW of about 75.5 g/eq.

Production of Epoxy Resin Compositions:

Examples 1 to 12

For each example, the ingredients specified in tables 1 to 3 were mixed in the specified amounts (in parts by weight) of the curing agent component by means of a centrifugal mixer (SpeedMixer™ DAC 150, FlackTek Inc.) and stored with exclusion of moisture.

The ingredients of the resin component specified in tables 1 to 3 were likewise processed and stored.

Subsequently, the two components of each composition were processed by means of the centrifugal mixer to give a homogeneous liquid and this was tested immediately as follows: 10 minutes after mixing, the viscosity was determined at 20° C. ("Viscosity (10')").

A first film was coated onto a glass plate in a layer thickness of 500 and this was stored/cured under standard climatic conditions. König hardness (König pendulum hardness, measured according to DIN EN ISO 1522) was determined on this film after 1 day ("König hardness (1 d SCC)"), after 2 days ("König hardness (2d SCC)"), after 4 days ("König hardness (4d SCC)"), after 7 days ("König hardness (7d SCC)") and after 14 days ("König hardness (14d SCC)"). After 14 days, the appearance of the film was assessed (designated "Appearance (SCC)" in the table). A "nice" film referred to one which was clear and had a shiny and nontacky surface with no structure. "Structure" refers to any kind of marking or pattern on the surface.

A second film was coated onto a glass plate in a layer thickness of 500 and, immediately after application, this was stored/cured at 8° C. and 80% relative humidity for 7 days and then under SCC for 3 weeks. 24 hours after application, a polypropylene bottletop beneath which a small moist sponge had been positioned was placed onto the film. After a further 24 hours, the sponge and the lid were removed and positioned at a new point on the film, where it was removed again and repositioned after 24 hours, a total of 4 times. Subsequently, the appearance of this film was assessed (designated as "Appearance (8°/80%)" in the tables), in the same way as described for Appearance (SCC). Also reported in each case here was the number of marks that were visible in the film as a result of the moist sponge and/or the lid on top. Again, the König hardness was determined on the films thus cured, in each case after 7 days at 8° C. and 80% relative humidity ("König hardness (7d 8°/80%)"), then after a further 2 days under SCC ("König hardness (+2d SCC)"), 7 days under SCC ("König hardness (+7d SCC)") and 14 d under SCC ("König hardness (+14d SCC)").

A further measure of yellowing that was determined was the change in color after weathering stress in a weathering tester. For this purpose, a further film in a layer thickness of 500 μm was coated onto a glass plate and stored/cured under standard climatic conditions for 2 weeks and then subjected to weathering stress in a weathering tester of the Q-Sun Xenon Xe-1 type with a Q-SUN Daylight-Q optical filter and a xenon lamp with a light intensity of 0.51 W/m² at 340 nm at a temperature of 65° C. for 72 hours (Q-Sun (72 h)). Subsequently, the color difference ΔE of the film thus subjected to weathering stress as compared with the corresponding unstressed film was determined by means of an NH310 colorimeter from Shenzen 3NH Technology Co. LTD, equipped with silicon photoelectric diode detector, light source A, color space measurement interface CIE L*a*b*C*H*. ΔE values of 0.5 to 1.5 represent a minor difference in color, 1.5 to 3 a noticeable difference in color, 3 to 6 a distinct difference in color, and more than 6 a major difference in color.

The results are reported in tables 1 to 3.

The examples labeled "(Ref.)" are comparative examples.

TABLE 1

Composition and properties of examples 1 to 4.

| Example | 1 | 2 (Ref.) | 3 | 4 (Ref.) |
|---|---|---|---|---|
| Resin component: | | | | |
| Araldite ® GY 250 | 167.2 | 167.2 | 167.2 | 167.2 |
| Araldite ® DY-E | 31.8 | 31.8 | 31.8 | 31.8 |

TABLE 1-continued

Composition and properties of examples 1 to 4.

| Example | 1 | 2 (Ref.) | 3 | 4 (Ref.) |
|---|---|---|---|---|
| Curing component: | | | | |
| Curing agent H1 | 79.1 | — | 79.1 | — |
| Adduct V1 | — | 40.5 | — | 40.5 |
| Benzylated PDA | — | 38.5 | — | 38.5 |
| Cardanol | — | — | 33.9 | 33.9 |
| Viscosity (10') [Pa · s] | 0.99 | 0.93 | 0.94 | 0.92 |
| König hardness [s] (1d SCC) | 73 | 111 | 17 | 27 |
| (2d SCC) | 158 | 183 | 42 | 59 |
| (4d SCC) | 210 | 239 | 80 | 98 |
| (7d SCC) | 228 | 246 | 97 | 115 |
| (14d SCC) | 225 | 248 | 116 | 122 |
| Appearance (SCC) | nice | nice | nice | nice |
| Q-Sun (72 h) ΔE | 1.9 | 1.5 | 3.5 | 5.0 |
| König hardness [s] (7d 8°/80%) | 63 | 74 | 18 | 25 |
| (+2d SCC) | 165 | 193 | 64 | 80 |
| (+7d SCC) | 213 | 234 | 91 | 109 |
| (+14d SCC) | 228 | 245 | 102 | 112 |
| Appearance (8°/80%) | nice | nice | nice | nice |
| Number of marks | 1 | 1 | 1 | 1 |

TABLE 2

Composition and properties of examples 5 to 8.

| Example | 5 | 6 (Ref.) | 7 | 8 (Ref.) |
|---|---|---|---|---|
| Resin component: | | | | |
| Araldite ® GY 250 | 167.2 | 167.2 | 167.2 | 167.2 |
| Araldite ® DY-E | 31.8 | 31.8 | 31.8 | 31.8 |
| Curing component: | | | | |
| Curing agent H2 | 82.7 | — | 82.7 | — |
| Adduct V1 | — | 55.8 | — | 55.8 |
| Benzylated PDA | — | 26.6 | — | 26.6 |
| Cardanol | — | — | 35.4 | 35.3 |
| Viscosity (10') [Pa · s] | 1.75 | 1.52 | 1.74 | 1.44 |
| König hardness [s] (1d SCC) | 69 | 99 | 14 | 22 |
| (2d SCC) | 155 | 176 | 38 | 52 |
| (4d SCC) | 203 | 227 | 69 | 94 |
| (7d SCC) | 230 | 235 | 90 | 112 |
| (14d SCC) | 225 | 225 | 108 | 120 |
| Appearance (SCC) | nice | nice | nice | nice |
| Q-Sun (72 h) ΔE | 1.3 | 1.2 | 2.3 | 3.4 |
| König hardness [s] (7d 8°/80%) | 57 | 70 | 17 | 21 |
| (+2d SCC) | 158 | 174 | 49 | 70 |
| (+7d SCC) | 213 | 225 | 81 | 102 |
| (+14d SCC) | 222 | 225 | 92 | 111 |
| Appearance (8°/80%) | nice | nice | nice | nice |
| Number of marks | 1 | 1 | 1 | 1 |

TABLE 3

Composition and properties of examples 9 to 12.

| Example | 9 | 10 (Ref) | 11 | 12 (Ref) |
|---|---|---|---|---|
| Resin component: | | | | |
| Araldite ® GY 250 | 167.2 | 167.2 | 167.2 | 167.2 |
| Araldite ® DY-E | 31.8 | 31.8 | 31.8 | 31.8 |
| Curing component: | | | | |
| Curing agent H3 | 75.5 | — | 75.5 | — |
| Adduct V2 | — | 75.5 | — | 75.5 |
| Cardanol | — | — | 32.4 | 32.4 |
| Viscosity (10') [Pa · s] | 1.69 | 1.50 | 1.92 | 1.75 |
| König hardness [s] (1d SCC) | 126 | 134 | 52 | 67 |
| (2d SCC) | 209 | 186 | 109 | 122 |
| (4d SCC) | 238 | 231 | 144 | 154 |
| (7d SCC) | 231 | 237 | 161 | 168 |
| (14d SCC) | 226 | 224 | 172 | 175 |
| Appearance (SCC) | nice | nice | nice | nice |
| Q-Sun (72 h) ΔE | 2.0 | 1.1 | 3.6 | 3.2 |
| König hardness [s] (7d 8°/80%) | 43 | 39 | 38 | 21 |
| (+2d SCC) | 150 | 112 | 105 | 85 |
| (+7d SCC) | 185 | 133 | 127 | 105 |
| (+14d SCC) | 200 | 146 | 140 | 106 |
| Appearance (8°/80%) | nice | sl. mk.[1] | nice | nice |
| Number of marks | 1 | 1 | 1 | 2 |

[1]slight marking on the surface

The invention claimed is:

1. A process for preparing a curing agent for epoxy resins, wherein
an amine mixture comprising at least one parent amine of the formula (I) and at least one alkylated amine of the formula (II)

$$H_2N-A-NH_2 \quad (I)$$

$$X-NH-A-NH-Y \quad (II)$$

where
A in both formulae is the same alkylene radical which has 2 to 6 carbon atoms,
X is a hydrogen radical or is Y,
Y is an alkyl or cycloalkyl or aralkyl radical which has 1 to 20 carbon atoms, optionally has heteroatoms and is free of active hydrogen,
is reacted with at least one glycidyl ether of the formula (III)

where
m is 1 or 2 or 3, and
Z is an m-valent hydrocarbyl radical optionally containing ether oxygen and having a molecular weight in the range from 56 to 1,500 g/mol.

2. The process as claimed in claim 1, wherein X is a hydrogen radical.

3. The process as claimed in claim 1, wherein the at least one monoalkylated amine of the formula (II) comprises at least one monoalkylated amine of the formula (II) in which X is a hydrogen radical and at least one dialkylated amine of the formula (II) in which X is Y.

4. The process as claimed in claim 1, wherein Y is a radical of the formula

where
$R^1$ is a hydrogen radical or is methyl or phenyl, and
$R^2$ is a five- or six- or seven-membered cycloalkyl or aryl radical which has 5 to 7 carbon atoms and is optionally alkyl-substituted.

5. The process as claimed in claim 1, wherein Y is selected from the group consisting of cyclohexylmethyl, benzyl, 1-phenylethyl and 1-naphthylmethyl.

6. The process as claimed in claim 1, wherein Z is the residue of o-, m- or p-cresyl glycidyl ether, bisphenol A diglycidyl ether, bisphenol F diglycidyl ether or bisphenol A/F diglycidyl ether after removal of the glycidoxy groups.

7. The process as claimed in claim 1, wherein the primary amino groups are present in a stoichiometric excess over the epoxy groups.

8. The process as claimed in claim 1, wherein the molar ratio between the parent amine of the formula (I) and the epoxy groups is in the range from 1/1 to 15/1.

9. The process as claimed in claim 1, wherein parent amine of the formula (I) that remains on completion of reaction is at least partly removed from the curing agent.

10. The process as claimed in claim 1, wherein the amine mixture used for the reaction with the glycidyl ether of the formula (III) is a reaction mixture from the alkylation of a superstoichiometric amount of at least one amine of the formula (I) with at least one alkylating agent.

11. A reaction mixture obtained from the process as claimed in claim 1.

12. An epoxy resin composition comprising
   a resin component comprising at least one epoxy resin and
   a curing component comprising the reaction mixture as claimed in claim 11.

13. A method comprising coating the epoxy resin composition as claimed in claim 12 onto a substrate.

14. A cured composition obtained from the curing of an epoxy resin composition as claimed in claim 11.

* * * * *